July 4, 1950 R. H. LONG 2,514,002
TRANSMISSION OPERATING MECHANISM
Filed Oct. 11, 1946 5 Sheets-Sheet 2

INVENTOR
RICHARD H. LONG
BY Ho Clayte
ATTORNEY

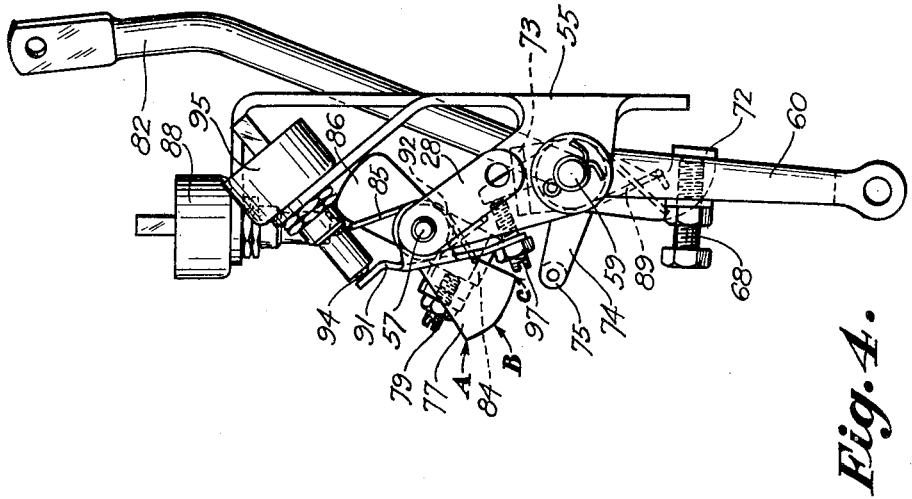
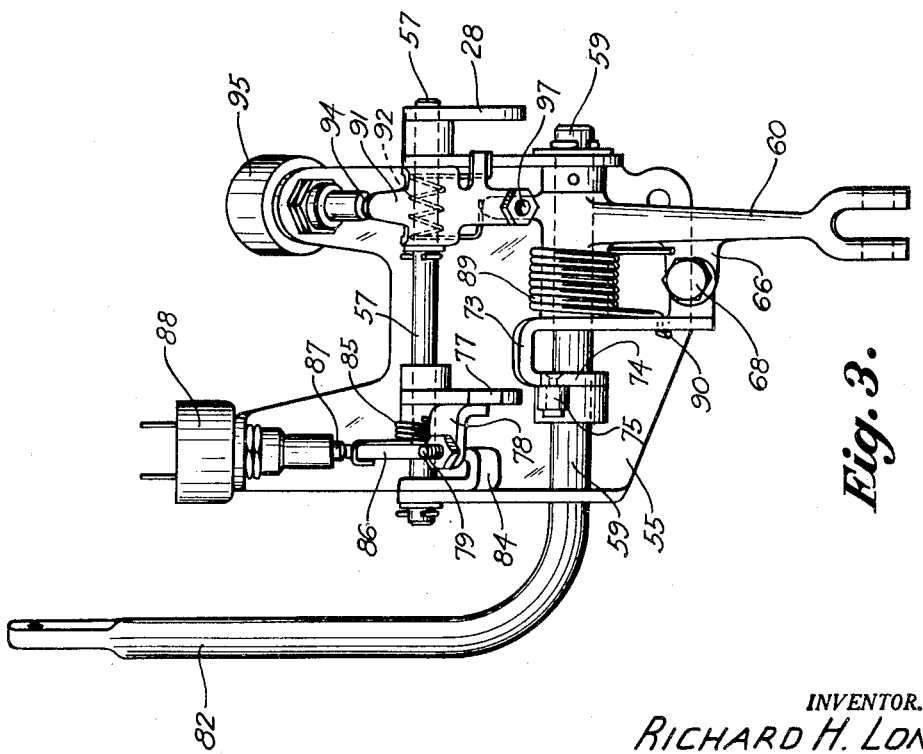

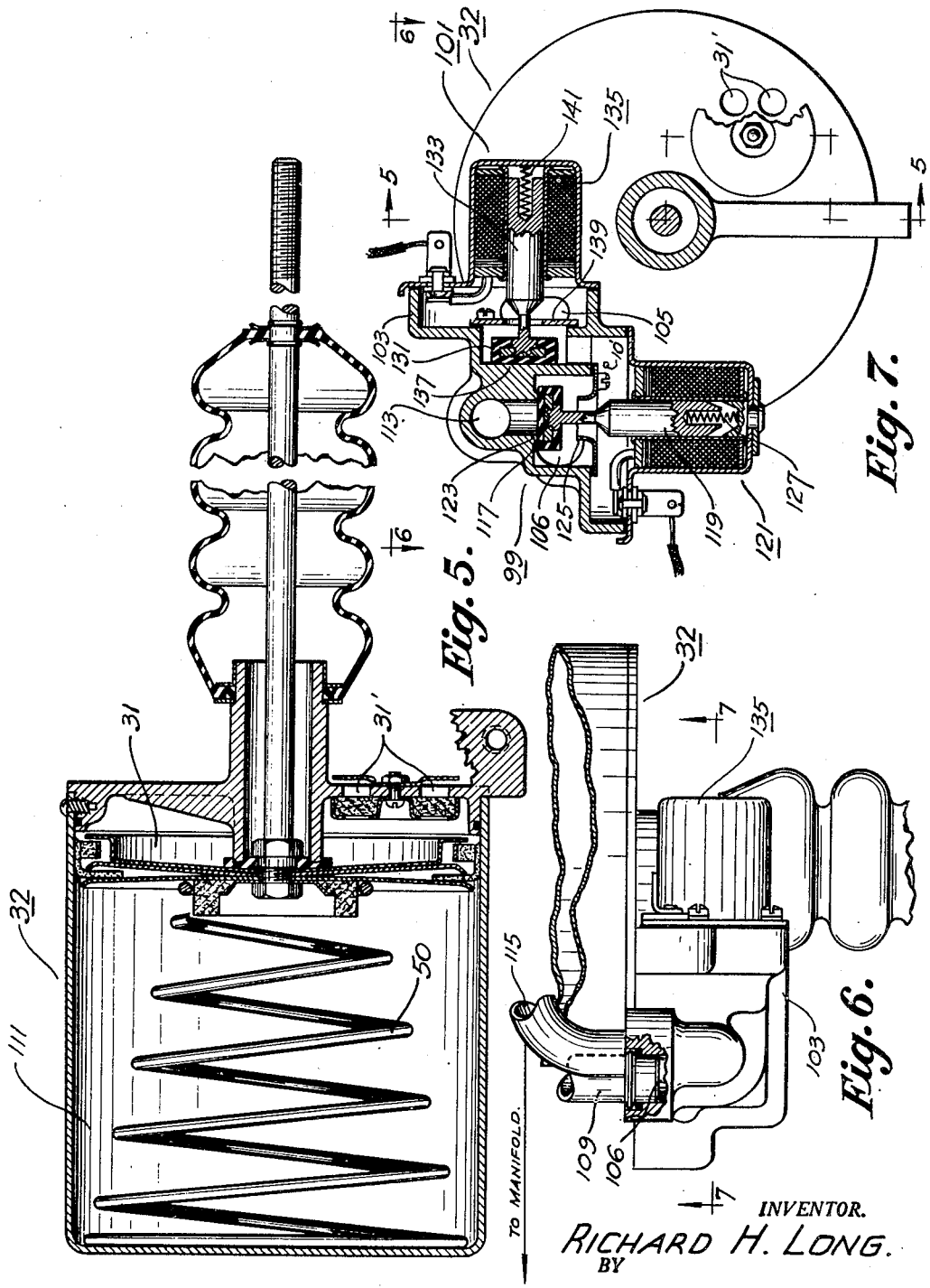

Patented July 4, 1950

2,514,002

UNITED STATES PATENT OFFICE 2,514,002

TRANSMISSION OPERATING MECHANISM

Richard H. Long, South Bend, Ind., assignor to Bendix Aviation Corporation, South Bend, Ind., a corporation of Delaware Application October 11, 1946, Serial No. 702,628

9 Claims. (Cl. 192—.073)

This invention relates in general to the power transmission mechanism of the power plant of an automotive vehicle and in particular to power and manually operated means for operating the change speed transmission of said power plant and for operating the throttle and the friction clutch to facilitate the operation of the transmission.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission and the operation of the throttle and friction clutch to facilitate said settings, being effected by power means if the driver elects this operation of the mechanism.

A further object of my invention is to provide, in an automotive vehicle including a fluid coupling, an accelerator, a friction clutch, an engine controlling throttle, a three speeds forward and reverse transmission, and a gear shift lever, means for operating and for facilitating the operation of said transmission, said means including power means, comprising a single acting motor, which is automatically operable, when the gear shift lever is placed in a certain position and after the accelerator is released, to establish the transmission either in its second gear setting or its high gear setting depending upon the speed of the vehicle, the friction clutch and the throttle being operated by said motor to facilitate this operation of the transmission, said means further including manually operated means for effecting any one of the gear settings of the transmission.

A further object of my invention is to provide a manually and power operated accelerator, motor, and governor controlled mechanism for operating a three speeds forward and reverse transmission and a friction clutch, said mechanism being capable of a manual operation to operate the transmission and also capable, after a selector lever of the mechanism is first operated to establish the transmission in its second gear setting and then positioned in a certain automatic setting, of effecting a power operation of the transmission to alternately effect the second and high gear settings thereof, the friction clutch being disengaged to facilitate each of said operations and re-engaged after each operation is completed.

Another object of my invention is to provide, in an automotive vehicle including a power plant comprising a fluid coupling, a friction clutch, a gear shift lever, an engine controlling throttle, a vehicle speed responsive governor and a change speed transmission, manually and power operated mechanism for operating the transmission to alternately effect two of its settings and for operating the throttle and clutch to facilitate said operation of the transmission, said mechanism including a single acting pressure differential operated motor operably connected to the transmission, clutch and throttle and operative, in one cycle of operations, to disengage the clutch, the throttle being held closed during said operation, then operate the transmission to establish one or the other of the aforementioned two settings, then re-engage the clutch in a plurality of stages of operation; and the principal object of my invention is to include in said mechanism a simple electrical means operative, with certain operations of switches operated by the gear shift lever, the governor, the accelerator, and the motor, to initiate and complete the aforementioned cycle of operations of the motor.

Yet another object of my invention is to provide means for operating the change speed transmission of an automotive vehicle, for example a two speed axle transmission mechanism, and for operating the friction clutch and throttle of the vehicle to facilitate the operation of the transmission, said means including a single acting motor operable in one uninterrupted cycle of operations to successively disengage the clutch and maintain the throttle closed during this operation, then operate the transmission to establish the same in a new setting, and then re-engage the clutch by a stage operation thereof and at the same time control the operation of the throttle; and it is a further object of my invention to control the aforementioned motor by an accelerator operated switch, a gear shift lever operated switch, a motor operated switch, a governor operated switch and a transmission operated switch mechanism the latter mechanism serving to insure a completion of the clutch disengaging, throttle closing and transmission operating operations of the motor once said operation is initiated and despite an opening of the accelerator operated switch and a change of setting of the governor operated switch during said operation of the motor, said latter switch mechanism also being operative to effect a de-energization of the motor, to re-engage the clutch and control the operation of the throttle, after the operation of the transmission is completed.

A further object of my invention is to provide, in the power plant of an automotive vehicle, power means for operating the change speed transmission of the plant to alternately establish the transmission in its second and high gear settings, said means also operating the clutch and throttle of the power plant to facilitate the operation of the transmission, the throttle being held closed while the clutch is being disengaged and during a part of its engaging operation, and the opening of the throttle, by an operation of the accelerator, being controlled during the remainder of the engagement of the clutch; and it is a further object of my invention to so construct said transmission, clutch and throttle operating power means that there is effected a stage engaging operation of the clutch if the accelerator is not depressed during the clutch engaging operation of the mechanism.

Other objects of the invention and desirable details of construction and combination of parts of the aforementioned mechanism, including the provision of a transmission controlling dash pot mechanism, will become apparent from the following description of a preferred embodiment of my invention, which description is taken in conjunction with the accompanying drawings, in which:

Figure 3 is a front view disclosing details of a part of the motor operated controls and also disclosing the accelerator operated switch of my invention;

Figure 4 is a side view of the mechanism disclosed in Figure 3;

Figure 5 is a sectional view, taken on the line 5—5 of Figure 7, disclosing details of the pressure differential operated motor of my invention;

Figure 6 is a view, partly in section and taken on the line 6—6 of Figure 7, disclosing details of the air transmitting ducts constituting part of the motor unit disclosed in Figures 5 and 7;

Figure 7 is a view, largely in section, disclosing details of the solenoid operated valves for controlling the operation of the motor unit in Figure 5;

Figure 1:
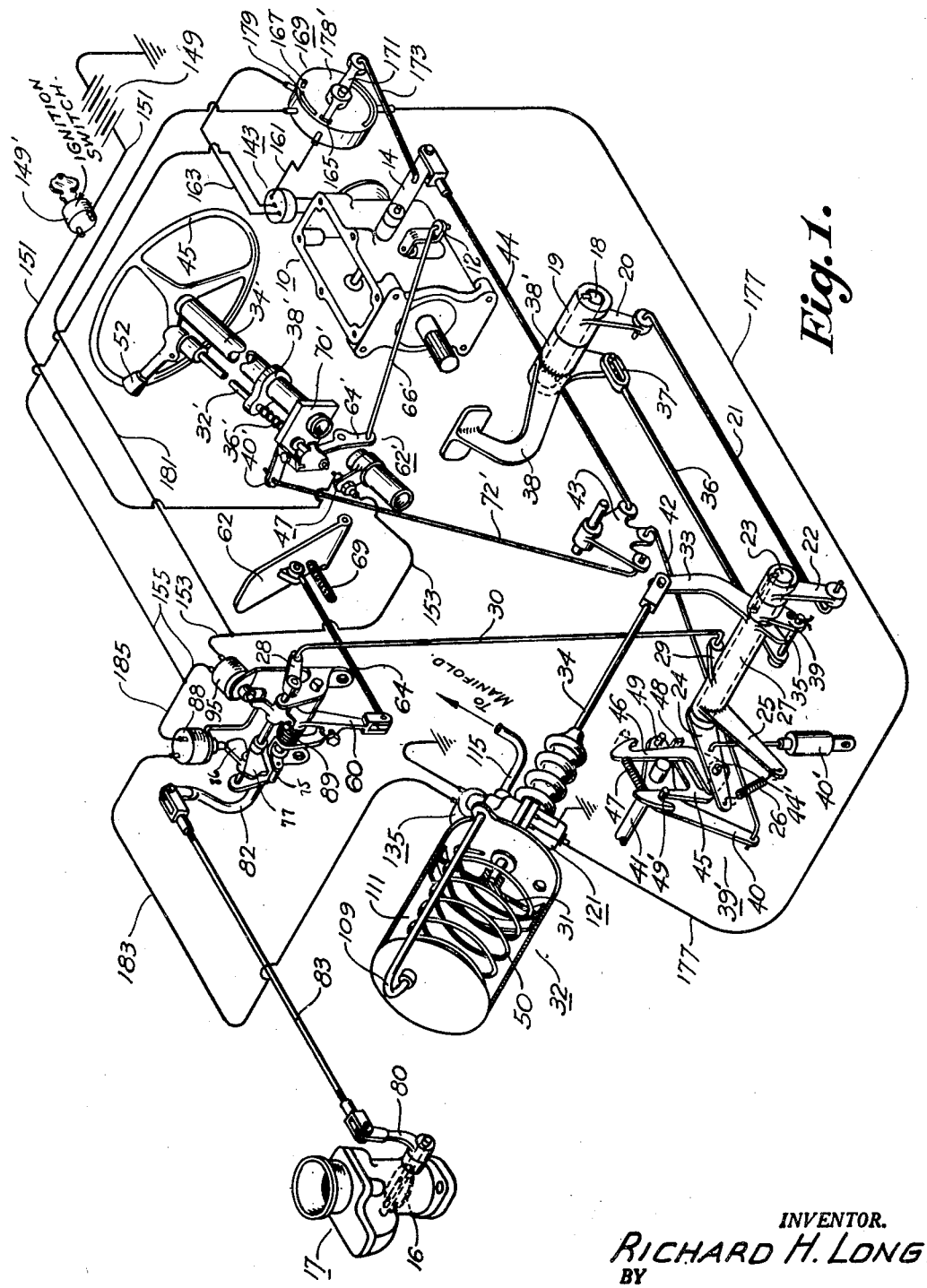
Figure 1 is a diagrammatic view of my invention disclosing the principal features thereof.

Referring now to Figure 1 disclosing a preferred embodiment of my invention, a three speeds forward and reverse transmission 10, preferably that used in one of the 1942 automotive vehicles, is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14, for operating the engine throttle 16 of the carburetor 17, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings. The mechanism of my invention also preferably includes, in the power plant of the vehicle, a fluid coupling such for example as that which was incorporated in several 1941 and 1942 passenger vehicles and said coupling includes an impeller and a vaned rotor the latter serving to drive the aforementioned driving plate of the clutch.

The friction clutch, not shown, is operably connected to a clutch throw out shaft 18 to which is keyed a sleeve 19; and to a crank 20, fixedly secured to said sleeve, there is pivotally connected a rod 21. The rod 21 is pivotally connected to a crank 22 which is keyed to a shaft 23; and upon one end of the latter shaft there is rotatably mounted a crank 24. The latter crank is yieldingly connected to a crank 25 by means of a spring 26; and to the crank 25 there is connected a sleeve 27 rotatably mounted on the shaft 23. The sleeve 27 is operably connected to a crank 28 by means of a crank 29 fixedly secured to said sleeve, and a rod 30 which is pivotally connected to the cranks 28 and 29.

The sleeve 27 is operably connected to a piston 31 of a pressure differential operated motor 32, by means of a two-armed crank 33 fixedly connected to said sleeve and by means of a rod 34 pivotally connected at one of its ends to the longer arm of the crank 33 and secured at its other end to said piston. The shorter of the two arms of the crank 33 abuts a pin 35 which is rotatably mounted, at one of its ends, in one end of a rod 36 said rod being connected at its other end, by a lost motion connection 37, to a manually operable clutch pedal 38. This pedal, constructed as a two-armed crank member, is rotatably mounted on the shaft 18 and is fixedly secured to a sleeve 38' which is also rotatably mounted on said shaft. The other end of the pin 35 is pivotally connected to a crank 39 which is keyed to the shaft 23.

There is thus provided manually and power operated means for operating the clutch, the clutch pedal 38, by virtue of the operation of the lost motion connection 37, remaining stationary when the motor 32 is energized to disengage the clutch.

Describing now the connection between the motor 32 and the transmission operated crank 14, as is described above the piston 31 of said motor is operably connected to the crank 24; and said crank 24 is connected to the transmission operating crank 14 by means of an alternator, that is, direction changing mechanism indicated as a whole in Figure 1, by the reference numeral 39'. This alternator preferably comprises a bell crank lever 40 pivotally mounted upon a support shaft 41; and one arm of said lever is pivotally connected, by a rod 42, to one of the arms of a three-armed crank 43. Another of the arms of the latter crank is connected to the transmission operating crank 14 by means of a rod 44. Two juxtaposed claw members 45 and 46 are pivotally connected, at their lower ends, to a pin 44' which extends through the crank 24; and the claw member 46 is biased, by a compression spring 47, into engagement with one end of a stop member 48 extending from and secured to the claw member 45. A pin 49, adapted to nest within the hooked end of the claw 46, is fixedly mounted on the end of the lever 40.

Describing the operation of the alternator 39' when the motor 32 is energized the piston 31 moves upwardly, Figure 1, thereby effecting a counter-clockwise rotation of the crank 25. The first increment of movement of the piston serves to disengage the clutch and control the operation of the throttle, the latter operation being described hereinafter, and during this operation the spring 26 is expanded there being no movement of the crank 24 until the clutch plates have been separated, that is until the driving torque of the power plant has been reversed. After the clutch plates are separated the expanded, that is, cocked spring 26 then serves to rotate the crank 24 counter-clockwise thereby bodily moving the claws 45 and 46 downwardly as a unit; and this operation serves to rotate the bell crank lever 40 in a counter-clockwise direction the hooked end of the claw 45 effecting this operation by virtue of its contact with a pin 49' mounted in one arm of said bell crank lever. This downward movement of the crank 24 to effect an operation of the transmission is preferably cushioned by the operation of a dash pot 40'; and it is also to be noted that as the pin 49 and the end of the claw 46 simultaneously move toward each other that the pin 49 rides upon the outer face of said claw to the dotted line position disclosed in Figure 1, the spring 47 being compressed during said operation to move the claw 46 away from the stop 48.

Now it will be apparent that this counter-clockwise rotation of the lever 40 serves to place the rod 42 in compression to rotate the crank 43 counter-clockwise thereby placing the rod 44 in compression and rotating the transmission operating crank 14 to establish the transmission in a new setting; and it is to be added that when the crank 24 is moved toward the crank 25 by the contracting operation of the spring 26, that the two cranks are then being rotated as a unit by the continued upward movement of the motor piston 31 as it moves to its upper end position in the motor 32.

Continuing the description of the operation of the alternator 39' when the motor 32 is de-energized, an operation which is initiated as the operation of the transmission is being completed, a return spring 50 within the motor, aided by the clutch engaging operation of the clutch springs and the spring within the dashpot 40', serves to rotate the cranks 24 and 25 clockwise as a unit the latter crank then contacting the pin 44'; and this operation serves to move the claws 45 and 46 upwardly as a unit the spring 47 functioning to rotate the claw 46 clockwise after the end of said claw has cleared the pin 49. The latter pin 49 is then nested within the hook-shaped end of the claw 46. It is apparent therefore that when this preselecting operation of the alternator is completed the parts are in position to effect a clockwise rotation of the lever 40 when the motor 32 is again energized. There is thus provided by the alternator 39' a direction changing mechanism to alternately effect a clockwise and a counter-clockwise rotation of the transmission operating crank 14 by the energization of the motor 32.

Describing now that part of the mechanism of my invention which is actuated by a manually operated gear shift lever 52, Figure 1, said mechanism includes a rotatable and bodily movable shaft 32' extending alongside the steering column 34' of the vehicle. As is disclosed in Figures 1, 8 and 9, the shaft 32' is biased downwardly by a spring 36' positioned between a stop 38' mounted on the steering column and a crank member 40' which is operably connected to said shaft by means of a clutch mechanism 42' described hereinafter. The shift lever 52 mounted beneath the steering wheel 45 is so connected to the shaft 32' that a rotation of said lever in a plane parallel to said wheel effects a rotation of said shaft about its longitudinal axis in the operation of either neutralizing the transmission or establishing the same in a gear setting; and this connection between the shift lever and shaft 32', which incidentally was used on one of the 1942 automotive vehicles, is also such that the cross-shift movement of the shift lever, that is, the movement in a plane perpendicular to the plane of the steering column, results in a bodily movement of the shaft 32' to either effect a shift rail selecting operation of the crank 12 or effect a declutching operation of the clutch 42' and a closing of a selector switch 47 to prepare the mechanism for its power operation.

Describing the aforementioned clutch mechanism 42', said mechanism includes a member 44' sleeved over the lower end of the shaft 32', said member being permanently secured in place to the crank 40'. The lower end portion of the member 44' is provided with a flange 46' which is recessed at 48', Figure 8, to provide a keyway for a key portion 50' of a spool-shaped end portion of a clutch member 52', said member being sleeved over and drivably connected by splines 54' to the end portion 56' of the shaft 32'. A nut 58', threaded on the end of the shaft portion 56', serves as a stop for the clutch mechanism which is biased downwardly by the operation of the spring 36'.

The upper arm 60' of a bell crank lever 62' fits within the spool-shaped portion of the clutch member 52' and the lower arm 64' of said lever is pivotally connected, by a link 66', to the shift rail selecting crank 12. As is disclosed in Figure 8, the spring 36' serves to bias the clutch 42' and shaft 32' as a unit downwardly, the movement being limited by a stop 68', Figure 9, constituting a part of a steering column mounted bracket member 70'; and in this position of the clutch 42' the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is a selection of the low and reverse gear shift rail of the transmission, the driver lifts the shift lever 52 upwardly in a plane perpendicular to the plane of the steering wheel; and this operation serves to rotate the bell crank lever 62' in a counter-clockwise direction, Figure 8, the spring 36' being compressed and the flange 46', Figure 9, being moved into engagement with the stop 68'. To actuate the shift rail operating crank 14 to neutralize the transmission or establish the same in any one of its four gear ratio settings, the driver rotates the shift lever 52 in a plane parallel to the plane of the steering wheel thereby effecting an angular movement of the crank 40' which is preferably connected to the crank 14 by force transmitting means including link 72', the aforementioned three-armed lever 43 and the link 44.

There is thus provided, by the above decribed mechanism, means for manually operating a three speeds forward and reverse transmission. and in this manual operation of the transmission the shift lever 52 is movable to six different positions, said selective movement outlining the letter H.

Referring now to Figures 3 and 4 there is disclosed therein details of certain other controls of the mechanism disclosed in Figure 1. A support member 55 serves as a mounting for a shaft 57 and a shaft 59 said shafts being journalled in the sides of said support member. The shaft 59 is operably connected to the throttle valve 16 by cranks 80 and 82 and a link 83. A two-armed crank 60, rotatably mounted on the shaft 59 and operably connected to the accelerator 62 of the car by a link 64 is provided with a laterally extending flange 66 within which is adjustably mounted stop member 68. This stop member is biased, by the operation of an accelerator return spring 69, into engagement with a flange member 72 extending laterally from a U-shaped fitting 73 fixed secured to the shaft 59. From the fitting 73 there extends a flange 74 which is provided at its end with a roller member 75. This roller member is contacted by a cam 77 which is fixedly mounted on the shaft 57; and mounted alongside the cam 77 there is provided a support 78 which is also fixedly mounted on the shaft 57. There is adjustably mounted in the support 78 a set screw 79 adapted at its inner end to contact a U-shaped member 84 which is rotatably mounted on the shaft 57 and which is biased clockwise into engagement with the set screw 79 by a spring 85. A cam 86, secured to the member 84, contacts a pin 87 extending from the movable contact, not shown, of a breaker switch 88; and this contact is biased, by a spring, not shown, to its switch open position and is moved to its switch closed position by the spring operated cam 86 which is shaped to effect a closing of the switch during a part of the clutch engaging movement of the motor piston 31. There is provided by the switch 88 and the cam means for operating the same, means for controlling the operation of a choke valve operating solenoid 135, Figure 7, to effect a controlled clutch engaging operation of the motor 32. The parts, including the contour of the face of the cam 86, are preferably so constructed and arranged and so operative that the solenoid 135 is energized, to move a valve member 131 away from a seat 137, during the clutch engaging movement of the piston 31 said operation being effected just as the piston reaches the point of clutch plate contact; and as stated above the parts are also so constructed and arranged and so operative that the switch 88 is subsequently opened, to effect a de-energization of the solenoid 135, during said clutch engaging movement of said piston. When the valve 131 is moved off of a seat 139 to the position disclosed in Figure 7, air rushes into the motor 32 at a relatively high rate to thereby effect a relatively rapid clutch engaging movement of the clutch driven plate, 75 and when the valve 131 is seated upon the seat 139 air flows into the motor 32 at a relatively low rate via a relatively small opening 10'. The solenoid 135 and valve means for controlling the operation of the motor 32, are described in greater detail hereinafter.

Continuing the description of the mechanism disclosed in Figure 3 a coil spring 89, sleeved over the hub of the crank 60, is connected at one of its ends 90 to the member 73 and the other end of said spring abuts the outer face of the flange 66 on said crank. There is thus provided by the spring 89 and cooperating parts including the cam 77, means, interconnecting the accelerator and throttle whereby the accelerator may be depressed without effecting an opening of the throttle when the motor 32 is energized to successively disengage the clutch and operate the transmission; for with the first increment of clutch disengaging movement of the piston 31, the cam 77 is rotated counter-clockwise, Figure 4, thereby providing, by its end portion A, B a stop to prevent a clockwise rotation, that is throttle opening movement, of the accelerator operated flange 74. And it is to be noted at this juncture that when the accelerator is depressed to cock the spring 89 and the motor 32 is de-energized to effect a re-engagement of the clutch, the cam 77 is rotated clockwise, Figure 4, to effect a controlled opening of the throttle as the clutch plates move into contact with each other, a segment B, C of said cam being shaped to effect this operation. Preferably all points along the segment A, B of the cam 77 are equally distant from the center of rotation of said cam; and the radius of the cam from the point B to the point C progressively decreases. There is thus provided, by the operation of the sector A, B of the cam 77, a stop means operative to prevent an opening of the throttle when the clutch is being disengaged and during the engagement of the clutch as the driven clutch plate moves up to a point just short of engagement with the driving clutch plate; and the subsequent operation of the segment B, C of said cam serves to make possible a progressively increased opening of the throttle, by the operation of the accelerator loaded spring 89, as the clutch plates move into driving engagement with each other.

Completing the description of the mechanism of Figure 3 a switch operating member 91, rotatably mounted on the shaft 57, is biased, by a coil spring 92, to rotate in counter-clockwise direction, Figure 4; and the lower end of the member 91 is adjustably connected to the upper arm of the two-armed crank 60 by means of a set screw 97 which is adjustably mounted on the member 91. The upper end of the switch operating member 91 abuts the lower end of a pin 94 which is connected to the movable contact of a breaker switch 95. The breaker switches 88 and 95 are both of standard construction accordingly the same are not disclosed in detail. Both of these switches preferably include a movable contact and a fixed contact, the movable contact being biased to its switch open position by a spring within the switch; and in the case of the accelerator operated switch 95 this spring is overcome, to close said switch, by the operation of the accelerator return spring 69. In other words the switch 95 is closed when the driver removes his foot from the accelerator to close the throttle.

The valve means for controlling the operation of the motor 32 is disclosed in detail in Figure 7 and includes a three way valve unit 99 and a choke valve unit 101. Both units are housed within a casing 103 preferably mounted on the casing of the motor 32. The casing 103 is preferably ported at 105 to provide a vent to the atmosphere, at 106 to receive a duct 109 leading to a control compartment 111 of the motor, and at 113 to receive a conduit 115 leading to the intake manifold of the internal combustion engine of the vehicle or other source of vacuum. The three way valve unit 99 includes a valve member 117 operably connected to the armature 119 of a solenoid 121 which is secured to the casing 103. When the solenoid 121 is energized the valve member 117 is moved downwardly, Figure 7, to leave a seat 123 and abut a seat 125 thereby connecting the compartment 111 with the intake manifold; and when said solenoid is de-energized a spring 127 serves to return the valve member to its seat 123 thereby venting the compartment 111 to the atmosphere via either the port 10' or both the ports 10' and the port 105 depending upon the operation of the choke valve of unit 101. The choke valve unit 101 includes the aforementioned valve member 131 which is operably connected to the armature 133 of a solenoid 135 secured to the valve casing 103. As previously briefly described when the solenoid 135 is energized the valve member 131 is moved off of a seat 137 onto a seat 139; and when the solenoid 135 is de-energized a spring 141 serves to return the valve member 131 to its seat 137.

Figures 2, 11:
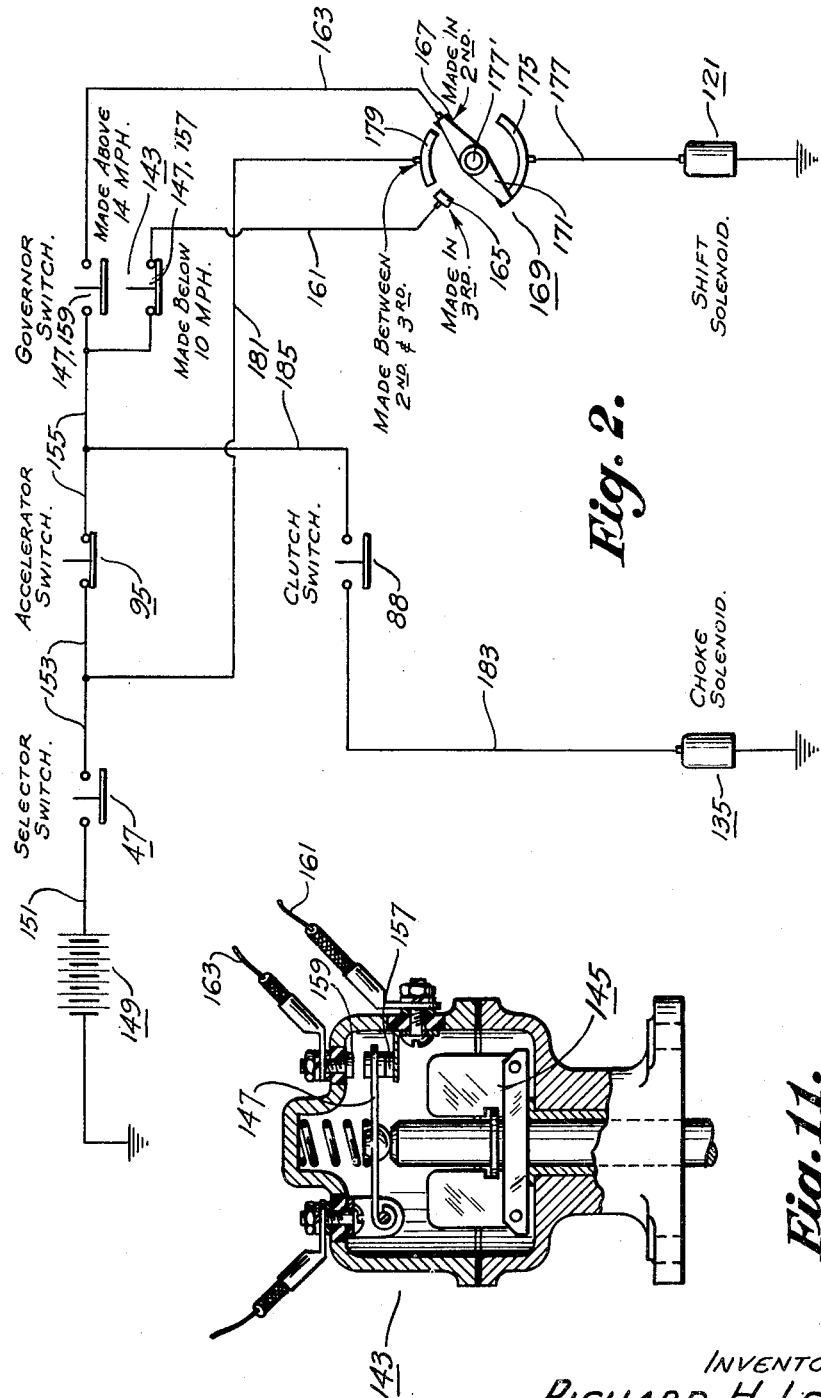
Figure 2 is a wiring diagram of the electrical mechanism disclosed in Figure 1.
Figure 11 is a view disclosing details of the governor operated switch of the mechanism of my invention.

The electrical means for controlling the operation of the solenoids 121 and 135 constitutes the most important feature of my invention said electrical means being disclosed in Figure 2. Describing this control means the movable contact 147 of a single pole double throw switch 143, Figure 11, operated by a vehicle speed responsive centrifugally operated governor 145, is electrically connected in series with the accelerator operated switch 95, the manually operated selector switch 47 and a grounded battery 149. Referring to Figures 1 and 2 the wiring interconnecting said switches and battery preferably includes a wire 151 interconnecting the battery 149 with the selector switch 47, a wire 153 interconnecting the latter switch with the movable contact of the accelerator switch 95, and a wire 155 interconnecting the fixed contact of the accelerator switch with the movable contact 147 of the governor operating switch 143. The latter switch includes fixed contacts 157 and 159 which are connected respectively by wires 161 and 163 to fixed contacts 165 and 167 of a multi-switch transmission operated switch mechanism 169. A movable contact 171 of the latter switch mechanism is operable as a crank and is pivotally mounted at its center upon a pin 177' extending from a switch box 178'; and to one end of the member 171 there is pivotally connected a link 173 which is pivotally connected to the transmission operating crank 14, Figure 1. The movable contact 171 is electrically connected to the solenoid 121 by a contact member 175 and a wire 177 connected to said member. A contact member 179 of the switch 169 is electrically connected to the wire 153 by a wire 181; and it is to be remembered that the wire 153 serves to electrically interconnect the switches 47 and 95 and accordingly the contact 179 is electrically connected to the circuit interconnecting the accelerator switch 95 and battery at a point which lies between said switch and battery. The contacts 165 and 171, contacts 171 and 179 and the contacts 167 and 171 of the switch mechanism 169 provide three separate switches; and the movable contact 171 is so connected with the transmission operating crank 14 and said mechanism is so constructed that the switch 167, 171 is closed when the transmission is established in its second gear setting, the switch 165, 171 is closed when the transmission is established in its high gear setting, and the switch 171, 179 is closed except when the transmission is completely or substantially completely established in either its second gear setting or its high gear setting.

Completing the description of the electrical control means of Figures 1 and 2 the grounded choke valve controlling solenoid 135 is wired to the motor operated clutch control switch 88 by a wire 183 and said switch 88 is connected, by a wire 185 to the wire 155 that is to a point in the electrical circuit lying between the accelerator switch 95 and the governor operated switch 143.

Describing now the complete operation of the mechanism of my invention, and incidentally completing the description of the parts of said mechanism not heretofore described, it will be assumed that the three speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 38 to disengage the clutch and will then operate the shift lever 52 to manually effect said setting. The accelerator will then be depressed as the clutch is re-engaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation the shift lever 52, which at the time is in its second gear setting, is rotated downwardly that is angularly in a clockwise direction in a plane perpendicular to the plane of the steering wheel; and this operation serves to bodily move the shaft 32 downwardly until the end portion 224 of said shaft serves to close the switch 47. This operation constitutes a declutching operation of the clutch mechanism 42', the clutch member 52' moving away from the clutch member 44' the movement of the latter being prevented by the stop 68'.

Figure 8:
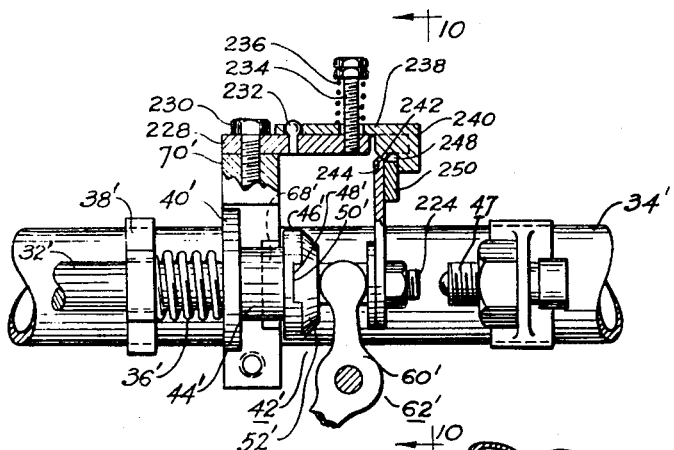
Figure 8 is an enlarged view of the mechanism at the base of the steering column, said mechanism serving to disconnect the shift lever from the power operated transmission operating linkage.
Figure 9:
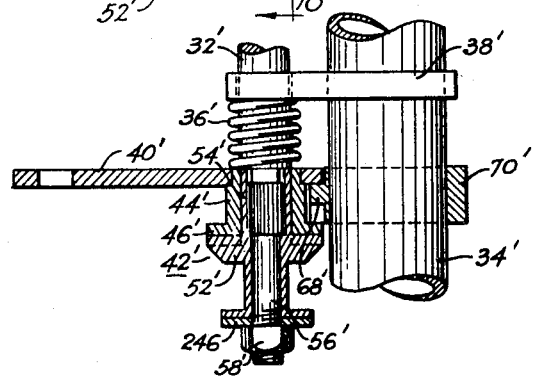
Figure 9 is a sectional view, taken on the line 9—9 of Figure 10, disclosing certain features of the mechanism disclosed in Figure 8.
Figure 10:
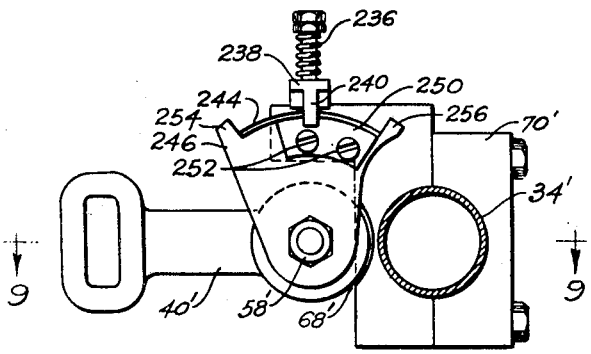
Figure 10 is a front view, taken on the line 10—10 of Figure 8, of the mechanism disclosed in Figure 8.

Referring to Figures 8 and 10 there is disclosed a latch mechanism for holding the shift lever in its automatic position, said mechanism including a relatively narrow rectangular shaped support member 228 preferably detachably secured to the bracket member 70' by a bolt 230; and there is mounted on said support member, by means of a guide pin 232, a bolt 234 and a spring 236, a movable latch member 238 shaped at its outer end to provide a relatively narrow stop member 240. Now when the shift lever 52 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56', Figure 9, between the lower flange portion of the clutch member 52' and the ut 58'; and this operation serves to position said peripheral edge portion 244 in the space indicated by the reference numeral 248, Figure 8. Incidentally the shift rail selecting mechanism of the transmission and the cooperating transmission parts are so constructed that the crank 62' may be moved beyond its second and high shift rail selective position in effecting the above described automatic setting of the shift lever.

Now at this juncture it is to be noted, from an inspection of Figure 10, that a rectangular shaped stop member 250, secured to the outer face of the stop member 246 by screws 252, is in contact with the member 240 when the parts are in their transmission neutral position and when the spring 36' has operated to move the crank 12 to its second and high shift rail position, that is the position preparing the transmission for either second or high gear operation. It follows therefore that the stop member 246 must be rotated clockwise in Figure 10 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 10 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Continuing the description of the operation of the mechanism the driver having moved the shift lever to its automatic position and assuming that the car is traveling above governor speed to close the switch 147, 159, Figures 2 and 11, the transmission will then be automatically established in its high gear setting after the driver releases the accelerator to close the switch 95; for with this operation an electrical circuit is completed via the grounded battery 149, an ignition switch 149', the then closed selector switch 47, the then closed accelerator operated switch 95, the switch 147, 159 of the governor operated switch 143, the switch 167, 171 of the switch mechanism 169, and the grounded solenoid 121. The resulting operation of the three way valve 99, Figure 7, effects an energization of the motor 32 the piston 31 of the said motor being then subjected to a differential of pressures to move the same to the left, Figures 1 and 5. The right side of the piston 31 is at all times subjected to the pressure of the atmosphere via screened openings 31' in one end of the motor 32; and the left side of said piston, that is, the side constituting a wall of the compartment 111, is subjected to a relatively low gaseous pressure when the three way valve 99 is opened to interconnect said compartment with the intake manifold or other source of vacuum. When the latter valve is closed, that is, when the solenoid 121 is de-energized, the compartment 111 is vented to the atmosphere through said valve and the spring 50 within said compartment is then operative to move the piston 31 to the right, Figure 1, to permit a re-engagement of the friction clutch by the operation of its springs.

Describing now the clutch disengaging, transmission operating and throttle controlling operation of the motor 32 the above referred to leftward movement of the piston 31 serves, during the first increment of movement of the piston, to rotate the crank 20 to disengage the clutch and rotate the cam 77 counterclockwise to bring the stop portion A, B of said cam opposite the accelerator operated crank 74; and as this operation is being effected the spring 26 is expanded inasmuch as the rod 44 can not be moved to operate the transmission until after the driving torque is reversed, that is, until after the clutch is disengaged. Now immediately after the clutch plates are moved out of contact with each other to reverse the driving torque the above described force transmitting means interconnecting the spring loaded crank 24 and the crank 14 becomes operative to move the latter crank and establish the transmission in its high gear setting; and as this operation of the transmission is being completed the transmission switch 169 is operated to make the switch 165, 171 and to break the switch 171, 179. The switch 167, 171 is broken during the first increment of movement of the piston 31; and the switch 171, 179 and its connection with the circuit between the switch 95 and the battery insures a completion of the high gear transmission operating operation of the motor 32 once initiated and despite a certain operation of the governor operated switch 143 which breaks the electrical connection between the switches 95 and 169 during said operation. The latter operation of the switch 143 is effected if the car brakes are suddenly applied to bring the car down below governor speed as the motor 32 is operating to establish the high gear setting of the transmission. If this unusual operation of the mechanism is effected then the driver, in order to effect a re-engagement of the clutch after the transmission is established in high gear, must depress the accelerator to open the switch 95 after the switch 165, 171 is closed. Now the breaking of the switch 95 results in a de-energization of the solenoid 121 and as described above this results in a de-energization of the motor 32 to initiate a preselecting operation of the alternator, and a controlled opening of the throttle.

The transmission will now remain in its high gear setting until the accelerator is again released whereupon the motor 32 will again be energized to establish the transmission in its second gear setting and to operate the clutch and throttle to facilitate said operation. If the car is then brought to a stop without neutralizing the transmission, that is leaving the shift lever in its automatic setting, the operation of the fluid coupling of the power plant will obviate a stalling of the engine despite the relatively high gear ratio setting of the transmission, that is its second gear setting, and despite the fact that the idling engine is at the time directly connected to the then stationary propeller shaft of the vehicle.

There is thus provided a simple, effective and efficient manually and power operated mechanism for operating the transmission, clutch and throttle of an automotive vehicle; and it is to be noted that the clutch pedal, the shift lever and the accelerator constitute the only manually operated controls of said mechanism. With the mechanism of my invention the driver may manually operate the clutch and the three speeds forward and reverse transmission in a conventional manner, that is, by operating the clutch pedal and by effecting the H movement of the shift lever; then if he desires an automatic operation of the transmission to alternately establish the same in its second and high gear settings he has only to move the shift lever from its second gear setting to its automatic setting. Thereafter for all normal straight ahead driving of the vehicle the driver need only operate the accelerator.

Briefly reviewing the operation of the mechanism to effect this shuttling operation of the transmission between its second and high gear settings it will be assumed that the transmission is established in second gear; then when the car is speeded up above governor speed and the accelerator is released, the motor 32 is energized to first disengage the clutch and simultaneously operate the cam 77 as a stop to prevent an engine racing operation of the throttle. The energized motor then effects an operation of the transmission to establish the same in its high gear setting; and just as the latter operation is being completed the motor is automatically de-energized to initiate a stage clutch engaging operation thereof. It is to be noted, however, that to effect the latter operation the accelerator must be released to make it possible for the spring 69 to hold the switch 95 closed. The throttle remains closed during this stage clutch engaging operation of the motor 32; however, should the driver depress the accelerator to open the switch 95 as the choke valve 131 is operating, then the lobe BC of the cam 77 will automatically come into play to prevent a racing of the engine. As to the latter operation it is to be noted, as previously described, that the choke valve 131 is not operable to control the clutch engaging operation of the motor 32 if the accelerator is depressed immediately after the operation of the motor 32 is initiated; for such an operation results in an opening of the switch 95 thereby making it impossible to energize the choke valve controlling solenoid 135.

There is thus provided a clutch, transmission and throttle controlling mechanism capable of effecting two different clutch engaging and throttle controlling operations of the mechanism depending upon the mode of operation of the accelerator. If the accelerator is depressed immediately after the operation of the motor is initiated then the mechanism is operative to control the mode of opening of the throttle for a certain period of time after the clutch plates come into contact with one another; and if the accelerator is left untouched after the same is released to initiate an operation of the motor, then there is effected a variable that is stage clutch engaging operation thereof there being no concurrent control of the throttle. With an operation of the mechanism of my invention the cycle of operations of the clutch, transmission and throttle is completed, once initiated, and despite an opening of the switch 95 during the clutch disengaging and transmission operating operations of the mechanism.

To effect a shift of the transmission from high gear to second gear the driver will bring the speed of the vehicle down below governor speed thereby effecting a closing of the switch 147, 157, and he will then release the accelerator to close the switch 95. The motor 32 will then be again energized to effect the second gear setting of the transmission, one or the other of the two previously described cycles of operation of the clutch, transmission and throttle being repeated, the particular operation depending upon whether or not the accelerator is depressed immediately after the operation of the motor is initiated.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In an automotive vehicle provided with a power plant including a throttle for in part controlling the operation of an internal combustion engine, an accelerator, a friction clutch, and change speed transmission; means for operating the transmission and for operating and controlling the operation of the clutch and throttle to facilitate the operation of the transmission, said means including force transmitting means, comprising a spring, interconnecting the accelerator and throttle, a single acting pressure differential operated motor, force transmitting and throttle controlling means interconnecting the power element of the motor, the clutch, the transmission, and the aforementioned force transmitting means and including a crank movable in one direction to effect one setting of the transmission and in another direction to establish another setting of the transmission, a direction changing mechanism operably connected to said crank, means, including a yieldable member, interconnecting the power element and the direction changing mechanism, and a throttle controlling cam member; valve means for controlling the operation of the motor, means for controlling the operation of said valve means comprising a grounded solenoid, and means for controlling the operation of said solenoid to effect the operation of the valve means said operation resulting in an operation of the motor to successively disengage the clutch and concurrently operate said cam to maintain the throttle closed, then operate the transmission to change its setting, and then re-engage the clutch and concurrently operate the cam to control the opening of the throttle, said solenoid controlling means including a grounded battery, a transmission controlling gear shift lever, a switch mechanism actuated by said gear shift lever, an accelerator operated switch, a vehicle speed responsive governor, and a single pole double throw switch means actuated by said governor, said battery, gear shift lever operated switch, accelerator operated switch and governor operated switch being electrically connected in series with each other, and a switch mechanism operated by the motor and including a fixed contact electrically connected to one of the fixed contacts of the governor operated switch, another fixed contact electrically connected to the other of the fixed contacts of the governor operated switch, a fixed contact electrically connected to the electrical connection interconnecting the accelerator operated switch and the battery, and a movable contact electrically connected to the grounded solenoid.

2. In an automotive vehicle provided with a power plant including a throttle for in part controlling the operation of an internal combustion engine, an accelerator, a friction clutch, and change speed transmission; means for operating the transmission and for operating and controlling the operation of the clutch and throttle to facilitate the operation of the transmission, said means including force transmitting means, comprising a spring, interconnecting the accelerator and throttle, a single acting pressure differential operated motor, force transmitting and throttle controlling means interconnecting the power element of the motor, the clutch, the transmission, and the aforementioned force transmitting means and including a crank movable in one direction to effect one setting of the transmission and in another direction to establish another setting of the transmission, a direction changing mechanism operably connected to said crank, means, including a yieldable member, interconnecting the power element and the direction changing mechanism, and a throttle controlling cam member; valve means, including a three way valve, for controlling the operation of the motor, means for controlling the operation of said valve means comprising a grounded solenoid, and means for controlling the operation of said solenoid to effect the operation of the valve means said operation resulting in an operation of the motor to successively disengage the clutch and concurrently operate said cam to maintain the throttle closed, then operate the transmission to change its setting, and then re-engage the clutch and concurrently operate the cam to control the opening of the throttle, said solenoid controlling means including a grounded battery, a transmission controlling gear shift lever, a switch mechanism actuated by said gear shift lever, an accelerator operated switch, a vehicle speed responsive governor, and a single pole double throw switch means actuated by said governor, said battery, gear shift lever operated switch, accelerator operated switch and governor operated switch being electrically connected in series with each other, and a switch mechanism operated by the motor and including a fixed contact electrically connected to one of the fixed contacts of the governor operated switch, another fixed contact electrically connected to the other of the fixed contacts of the governer operated switch, a fixed contact electrically connected to the electrical connection interconnecting the accelerator operated switch and the battery, and a movable contact electrically connected to the grounded solenoid.

3. In an automotive vehicle provided with a power plant including a throttle for in part controlling the operation of an internal combustion engine, an accelerator, a friction clutch, and change speed transmission; means for operating the transmission and for operating and controlling the operation of the clutch and throttle to facilitate the operation of the transmission, said means including force transmitting means, comprising a spring, interconnecting the accelerator and throttle, a single acting pressure differential operated motor, force transmitting and throttle controlling means interconnecting the power element of the motor, the clutch, the transmission, and the aforementioned force transmitting means and including a crank movable in one direction to effect one setting of the transmission and in another direction to establish another setting of the transmission, a direction changing mechanism operably connected to said crank, means, including a yieldable member, interconnecting the power element and the direction changing mechanism, and a throttle controlling cam member; valve means, including a three way valve, and a choke valve for controlling the flow of air into said three way valve, for controlling the operation of the motor, means for controlling the operation of said valve means comprising a grounded solenoid for operating the three way valve and a grounded solenoid for operating the choke valve, and means for controlling the operation of said solenoids to effect the operation of the valve means said operation resulting in an operation of the motor to successively disengage the clutch and concurrently operate said cam to maintain the throttle closed, then operate the transmission to change its setting, and then re-engage the clutch and concurrently operate the cam to control the opening of the throttle, said means for controlling the solenoids including a grounded battery, a transmission controlling gear shift lever, a switch mechanism actuated by said gear shift lever, an accelerator operated switch, a vehicle speed responsive governor, and a single pole double throw switch means actuated by said governor, said battery, gear shift lever operated switch, accelerator operated switch and governor operated switch being electrically connected in series with each other, a switch mechanism operated by the motor and including a fixed contact electrically connected to one of the fixed contacts of the governor operated switch, another fixed contact electrically connected to the other of the fixed contacts of the governor operated switch, a fixed contact electrically connected to the electrical connection interconnecting the accelerator operated switch and the battery, and a movable contact electrically connected to the grounded solenoid, and switch mechanism actuated by the second mentioned force transmitting means and operative to control the operation of the grounded choke valve operating solenoid.

4. In an automotive vehicle provided with a power plant including a change speed transmission, a friction clutch, and an accelerator; means for operating the transmission and for operating the clutch to facilitate said operation of the transmission including a single acting pressure differential operated motor, valve means for controlling the operation of said motor, force transmitting means interconnecting the power element of the motor, the clutch and the transmission and operative, with a successive energization and controlled de-energization of said motor, to successively disengage the clutch, operate the transmission to change its setting and effect a stage re-engagement of the clutch and concurrently prepare the force transmitting means for another operation of the transmission, together with means for operating said valve means to effect said operations of the motor to thereby effect the aforementioned operations of the force transmitting means, said valve operating means including a grounded battery, a vehicle speed responsive governor, a single pole double throw switch mechanism operated by said governor, an accelerator operated breaker switch, electrical means interconnecting, in series, the movable contact of the governor operated switch, the accelerator operated switch and the battery, a grounded solenoid, a motor operated switch mechanism having a movable contact directly wired to said solenoid, a fixed contact wired to one of the fixed contacts of the governor operated switch, another fixed contact wired to the other of the fixed contacts of the governor operated switch and a fixed contact wired directly to that part of the aforementioned electrical means which connects the battery and the accelerator operated switch; said valve operating means further including means controlled by an operation of the power element of the motor and the accelerator operated switch.

5. In an automotive vehicle provided with a power plant including a change speed transmission, a friction clutch, and an accelerator; means for operating the transmission and for operating the clutch to facilitate said operation of the transmission including a single acting pressure differential operated motor, valve means for controlling the operation of said motor, force transmitting means interconnecting the power element of the motor with the clutch and transmission and operative, with a successive energization and controlled de-energization of said motor, to succesively disengage the clutch, operate the transmission to change its setting and then effect a stage re-engagement of the clutch and concurrently prepare the force transmitting means for another operation of the transmission, together with means for operating said valve means to effect said operations of the motor to thereby effect the aforementioned operations of the force transmitting means, said valve operating means including a grounded battery, a vehicle speed responsive governor, a single pole double throw switch mechanism operated by said governor, an accelerator operated breaker switch, electrical means interconnecting, in series, the movable contact of the governor operated switch, the accelerator operated switch and the battery, said valve operating means further including a grounded solenoid, a motor operated switch mechanism having a movable contact directly wired to said solenoid, a fixed contact wired to one of the fixed contacts of the governor operated switch, another fixed contact wired to the other of the fixed contacts of the governor operated switch and a fixed contact wired directly to that part of the aforementioned electrical means which connects the battery and the accelerator operated switch, said valve operating means further including a cam member operably connected to that part of the aforementioned force transmitting means which is directly connected to the motor piston, switch means operably connected to said cam member, another grounded solenoid, and electrical means interconnecting the latter solenoid, the latter switch means and the accelerator operated switch.

6. In an automotive vehicle provided with an engine controlling throttle, an accelerator, a gear shift lever, a friction clutch and a change speed transmission; force transmitting means, including a yieldable member, interconnecting the accelerator and throttle, a cam for controlling the movement of that portion of the force transmitting means interconnecting the yieldable member and throttle, a single acting transmission and clutch operating and throttle controlling pressure differential operated motor, force transmitting means, including a direction changing alternator mechanism and a yieldable member, interconnecting the power element of the motor, the cam, the transmission and the clutch; valve means, including a three way valve and a choke valve, for controlling the operation of said motor, and electrical means for controlling the operation of said valve means to successively effect an energization of the motor and a controlled de-energization thereof, said electrical means comprising a grounded battery, a grounded solenoid for operating said three way valve, a gear shift lever operated switch, an accelerator operated switch and a single pole double throw governor operated switch the latter three switches being wired in series with the battery, said electrical means further including a switch mechanism operated by the aforementioned motor and comprising three fixed contacts and a movable contact, electrical means directly interconnecting the movable contact and the grounded solenoid, electrical means interconnecting one of the latter fixed contacts with one of the fixed contacts of the governor operated switch, electrical means interconnecting another of the latter fixed contacts with the other of the fixed contacts of the governor operated switch, electrical means interconnecting the third of the three fixed contacts of the latter switch mechanism with that part of the electrical means interconnecting the accelerator operated switch and the gear shift lever operated switch; and electrical means for operating the choke valve, said means being electrically connected to the electrical means interconnecting the governor operated switch and the accelerator operated switch.

7. In an automotive vehicle provided with a power plant comprising an engine controlling throttle, an accelerator, a change speed transmission and a friction clutch; means for operating the transmission and for operating the clutch and throttle to facilitate said operation of the transmission, said means including force transmitting means interconnecting the accelerator and throttle, a clutch and transmission operating and throttle controlling single acting fluid pressure operated motor, force transmitting means interconnecting the power element of the motor, the clutch and the transmission, means interconnecting the two force transmitting means and operative to control the operation of the throttle, valve means, including a three way valve for controlling the flow of air into and from the motor and a choke valve for controlling the flow of air into the motor, and means for controlling the operation of said valve means to effect, in one cycle of operations, an operation of the motor to first disengage the clutch, said operation being accompanied by a closing of the throttle, then an operation of the transmission to change its setting, then a controlled re-engagement of the clutch, said valve controlling means including a battery, a solenoid for controlling the three way valve, an accelerator operated switch, a governor operated single pole double throw switch the movable contact of which is electrically connected in series with the accelerator switch and battery, a cut off and preselector switch mechanism operated by the aforementioned motor and electrically connected to the two fixed contacts of the governor operated switch, to the aforementioned solenoid, and to that part of the aforementioned electrical connection interconnecting the accelerator switch and battery; together with another grounded solenoid for operating the choke valve, a switch operated by the motor and operative to control the operation of the latter solenoid, and electrical means interconnecting the solenoid, the latter switch and that part of the aforementioned electrical means which interconnects the governor operated switch and the accelerator operated switch.

8. In an automotive vehicle provided with a power plant comprising an engine controlling throttle, an accelerator, a change speed transmission and a friction clutch; means for operating the transmission and for operating the clutch and throttle to facilitate said operation of the transmission said means including force transmitting means, comprising a spring, interconnecting the accelerator and throttle, a clutch and transmission operating and throttle controlling single acting fluid pressure operated motor, force transmitting means, including a direction changing alternator unit, interconnecting the power element of the motor, the clutch and the transmission, means, including a cam member, interconnecting the two force transmitting means and operative to control the operation of the throttle, valve means, including a three way valve for controlling the flow of air into and from the motor and a choke valve for controlling the flow of air into the motor, and means for controlling the operation of said valve means to effect, in one cycle of operations, an operation of the motor to first disengage the clutch said operation being accompanied by a closing of the throttle, then an operation of the transmission to change its setting, then a controlled re-engagement of the clutch, said valve controlling means including a grounded battery, a grounded solenoid for controlling the three way valve, an accelerator operated switch, a governor operated single pole double throw switch the movable contact of which is electrically connected in series with the accelerator switch and battery, a cut off and preselector switch mechanism operated by the aforementioned motor and electrically connected to the two fixed contacts of the governor operated switch, to the aforementioned solenoid, and to that part of the aforementioned electrical connection interconnecting the accelerator switch and battery; together with another grounded solenoid for operating the choke valve, a switch operated by the motor and operative to control the operation of the latter solenoid, and electrical means interconnecting the latter solenoid, the latter switch and that part of the aforementioned electrical means which interconnects the governor operated switch and the accelerator operated switch.

9. In an automotive vehicle provided with a throttle, an accelerator, a change speed transmission and a friction clutch; manually and power operated means for operating the transmission to alternately effect two different settings thereof and to operate the clutch and throttle to facilitate said operation of the transmission, said means including a single acting pressure differential operated motor, means interconnecting the power element of the motor, the clutch, the throttle and the accelerator said means serving, when the motor is successively energized and de-energized, to in one cycle of operations successively disengage the clutch and concurrently maintain the throttle closed, operate the transmission to establish one of the aforementioned two settings, re-engage the clutch by a stage operation of the motor and concurrently control the operation of the throttle to make possible a progressive opening of the same when the accelerator is depressed; valve means for controlling the operation of said motor to effect the aforementioned cycle of operations, and means for controlling the operation of said valve means including a grounded battery, an accelerator operated switch electrically connected to the battery, a grounded valve operating solenoid, electrical means interconnecting the grounded solenoid and the accelerator operated switch said means including a vehicle speed responsive governor operated switch means, and switch means operated by the aforementioned motor, the two last mentioned switch means serving, when the vehicle speed is dropped below a certain factor to complete an electrical circuit to energize the solenoid, the motor operated switch means subsequently functioning to break said electrical circuit when the transmission is established in one of the two aforementioned settings; together with another solenoid for operating a part of the valve means, and electrical means, including a switch operated by the motor, for controlling the operation of the latter solenoid said latter electrical means being electrically connected to the electrical means interconnecting the accelerator operated switch and the governor operated switch.

RICHARD H. LONG.

REFERENCES CITED

The following references are of record in the file of this patent:

UNITED STATES PATENTS

| Number | Name | Date |
|---|---|---|
| 1,911,599 | Bloxsom | May 30, 1933 |
| 2,031,807 | Werner | Feb. 25, 1936 |
| 2,068,716 | Tenney et al. | Jan. 26, 1937 |
| 2,098,691 | Neff | Nov. 9, 1937 |
| 2,115,117 | Neff | Apr. 26, 1938 |